(12) United States Patent
Deljavan Farshi et al.

(10) Patent No.: US 12,008,419 B2
(45) Date of Patent: *Jun. 11, 2024

(54) SYSTEM AND METHOD FOR MONITORING EVENTS IN PROCESS MANAGEMENT SYSTEMS

(71) Applicant: The Toronto-Dominion Bank, Toronto (CA)

(72) Inventors: Arash Deljavan Farshi, Richmond Hill (CA); Ivan Attard, Toronto (CA); Preetkanwal Samra, Brampton (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/822,222

(22) Filed: Aug. 25, 2022

(65) Prior Publication Data
US 2022/0405156 A1    Dec. 22, 2022

Related U.S. Application Data

(63) Continuation of application No. 17/248,693, filed on Feb. 3, 2021, now Pat. No. 11,461,153.

(51) Int. Cl.
*G06F 9/54* (2006.01)
*G06F 9/451* (2018.01)
*G06Q 10/0633* (2023.01)

(52) U.S. Cl.
CPC .............. *G06F 9/542* (2013.01); *G06F 9/451* (2018.02); *G06Q 10/0633* (2013.01)

(58) Field of Classification Search
CPC .... G06F 9/542; G06F 11/3055; G06F 11/302; G06F 2201/86
See application file for complete search history.

(56) References Cited

U.S. PATENT DOCUMENTS

| | | | |
|---|---|---|---|
| 6,910,070 B1 | 6/2005 | Mishra et al. | |
| 8,621,072 B2 | 12/2013 | Howard et al. | |
| 8,825,798 B1 | 8/2014 | Johnson | |
| 9,934,027 B2 | 4/2018 | Shine et al. | |
| 10,503,568 B2 | 12/2019 | Chandrasekaran | |
| 10,657,537 B2 | 5/2020 | Revelle et al. | |
| 2002/0026433 A1* | 2/2002 | Kuiper | G06Q 30/08 706/45 |
| 2002/0123966 A1 | 9/2002 | Chu et al. | |
| 2003/0088433 A1 | 5/2003 | Young | |

(Continued)

*Primary Examiner* — Charles E Anya
(74) *Attorney, Agent, or Firm* — CPST Intellectual Property Inc.; Brett J. Slaney

(57) ABSTRACT

A system and method are provided for monitoring events in process management systems. The method is executed by a device having a communications module and includes obtaining first event data from a plurality of process management systems, each process management system being associated with a corresponding process flow; asynchronously from obtaining the first event data, providing second event data for at least two of the plurality of process management systems, to a monitoring tool, the second event data for the at least two process management systems being generated from a same client interacting with the at least two process management systems; and in response to providing the second event data to the monitoring tool, initiating at least one action to be executed.

20 Claims, 10 Drawing Sheets

(56) References Cited

U.S. PATENT DOCUMENTS

| | | |
|---|---|---|
| 2003/0126181 A1 | 7/2003 | Young |
| 2005/0256732 A1 | 11/2005 | Bauer |
| 2007/0156656 A1 | 7/2007 | Pather |
| 2007/0208587 A1 | 9/2007 | Sitaraman |
| 2008/0183744 A1* | 7/2008 | Adendorff ............. G06Q 10/10 707/999.102 |
| 2010/0070479 A1 | 3/2010 | Maitino |
| 2012/0239541 A1 | 9/2012 | Tsukahara |
| 2013/0166963 A1* | 6/2013 | Stoyanov ............ G06F 11/0784 714/48 |
| 2014/0108251 A1 | 4/2014 | Anderson |
| 2015/0006235 A1* | 1/2015 | Jandhyala ........ G06Q 10/06316 705/7.26 |
| 2015/0074045 A1 | 3/2015 | Belfils |
| 2015/0142501 A1 | 5/2015 | Nair |
| 2015/0302303 A1 | 10/2015 | Hakim |
| 2015/0379469 A1 | 12/2015 | Gordon |
| 2016/0164893 A1 | 6/2016 | Levi |
| 2016/0239531 A1* | 8/2016 | P ............................. G06F 16/93 |
| 2017/0083929 A1 | 3/2017 | Bates et al. |
| 2017/0154083 A1 | 6/2017 | Sunaram P |
| 2018/0270317 A1 | 9/2018 | Feng |
| 2018/0287969 A1 | 10/2018 | Braodhurst |
| 2019/0102411 A1 | 4/2019 | Hung et al. |
| 2019/0363986 A1 | 11/2019 | Bhattacharjee |
| 2020/0028701 A1 | 1/2020 | Liu |

* cited by examiner

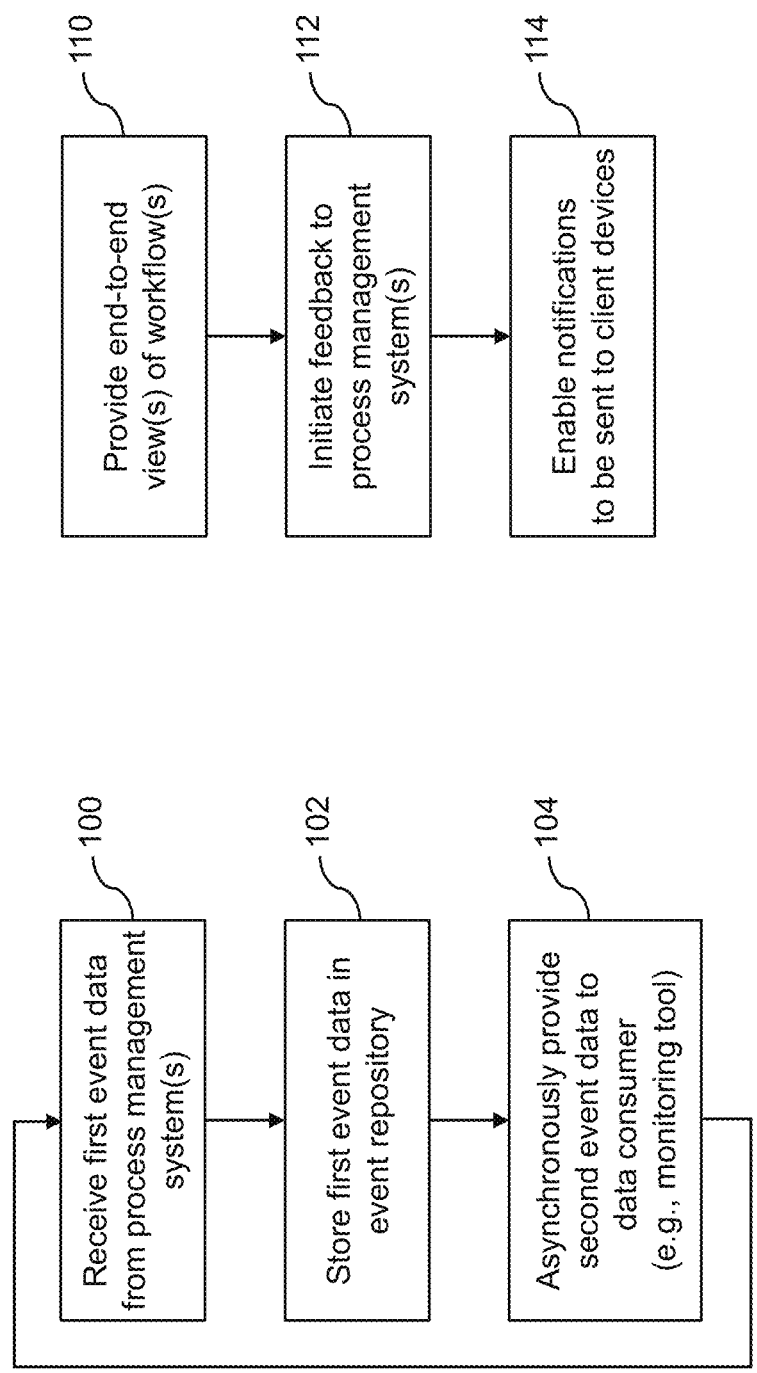

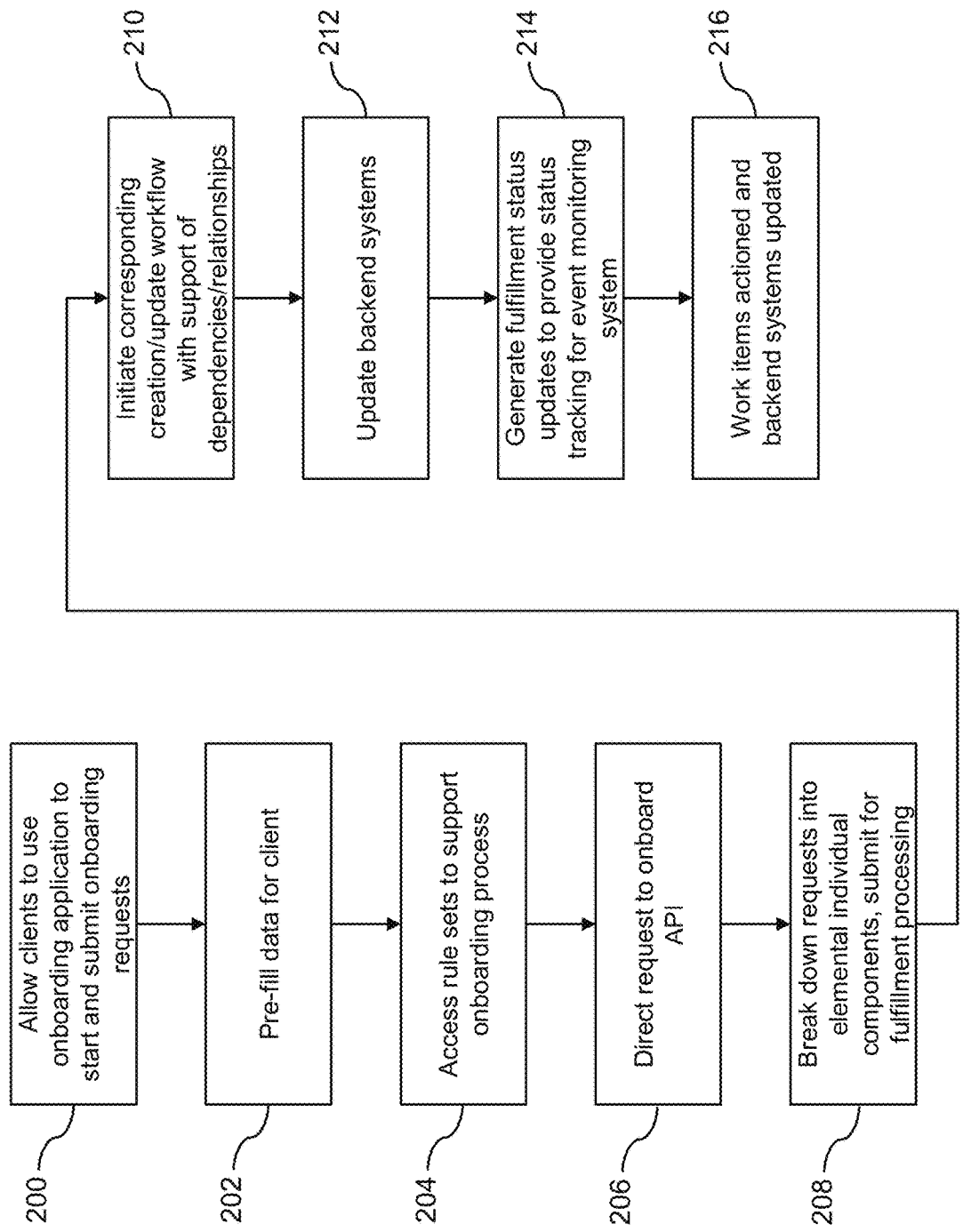

SYSTEM AND METHOD FOR MONITORING EVENTS IN PROCESS MANAGEMENT SYSTEMS

CROSS-REFERENCE TO RELATED APPLICATION(S)

This application is a Continuation of U.S. patent application Ser. No. 17/248,693 filed Feb. 3, 2021, and issued as U.S. Pat. No. 11,461,153 on Oct. 4, 2022, the contents of which are incorporated herein by reference in their entirety.

TECHNICAL FIELD

The following relates generally to monitoring events in process management systems.

BACKGROUND

Process management systems can be used to manage process workflows that implement tasks according to a set of rules. For example, a business process such as onboarding a new client to an application or service may have an associated process management system that implements corresponding business process rules for that particular application or service.

Process management can become complex when multiple process management systems are operating together with various workflows, requests, actions, communications, and approvals working in tandem. For example, onboarding a new client or customer to multiple related or interconnected applications may involve several concurrent workflows and requests that can be difficult to manage when only being able to access or visualize the systems individually.

BRIEF DESCRIPTION OF THE DRAWINGS

Embodiments will now be described with reference to the appended drawings wherein:

FIG. 6 is a flow diagram of an example of computer executable instructions for monitoring events in process management systems.

FIG. 7 is a flow diagram of an example of computer executable instructions for interacting with a process management system based on event monitoring.

FIG. 9 is a flow diagram of an example of computer executable instructions for onboarding a client to the wealth management onboarding system.

DETAILED DESCRIPTION

Figure 1:
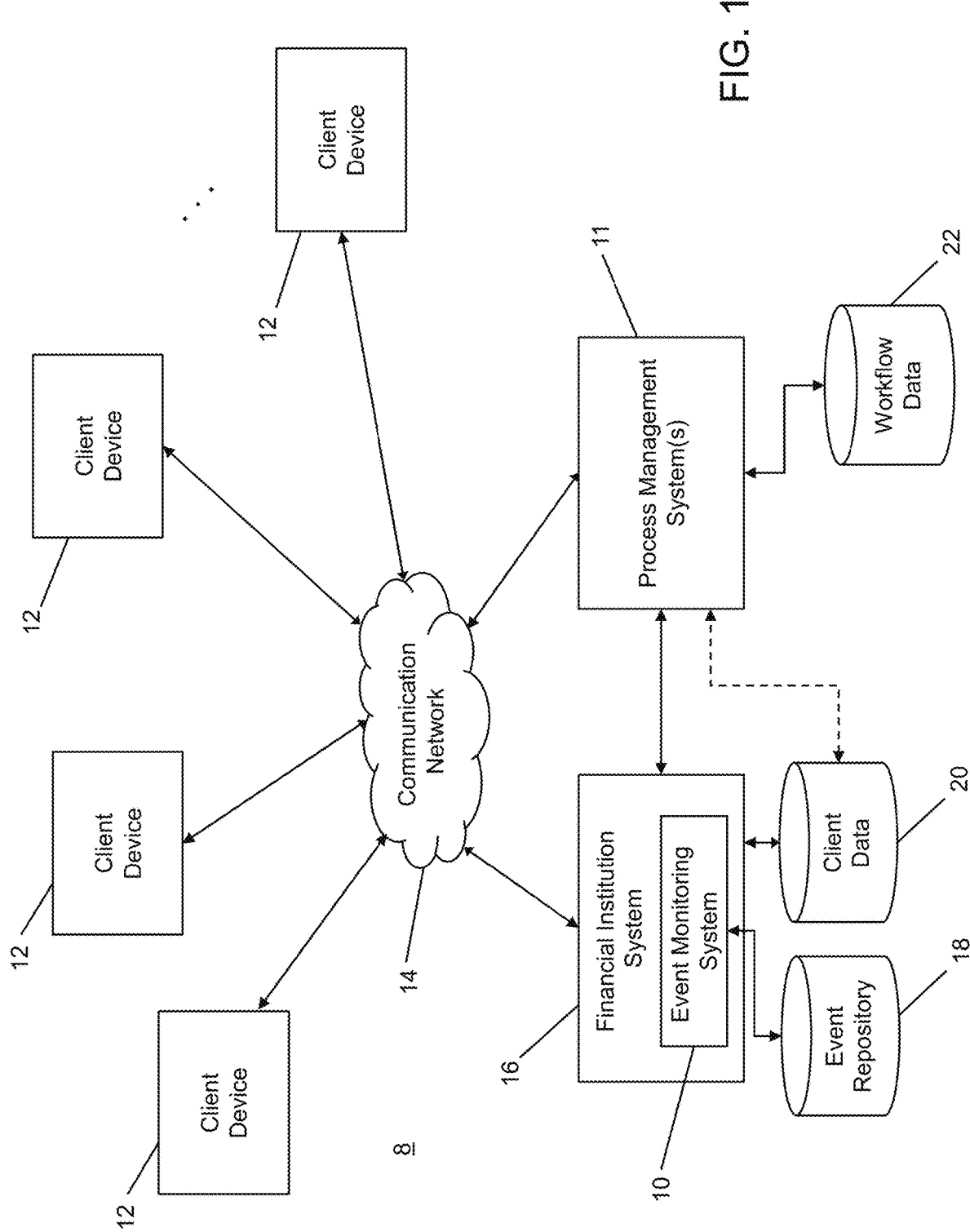
FIG. 1 is a schematic diagram of an example computing environment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

To monitor and manage workflows and processes implemented by one or more process management systems, an event monitoring system is described that asynchronously obtains and stores event data (e.g., messages) generated by the one or more process management systems such that the event data can be asynchronously consumed by a monitoring tool to both provide visualizations of an end-to-end view of workflows from a client or employee perspective, but also to provide feedback to a process management system (e.g., to update and/or move a process flow) and notifications to users such as clients and employees.

In another aspect, the presently described system can make the event data available to an analytics engine to analyze the event data, workflows, and to determine issues or improve upon workflows through such analyses.

It will be appreciated that while examples provided herein are directed to financial institution applications and services such as wealth onboarding, the principles discussed herein equally apply to other process management systems and process management workflows used by any organization or enterprise.

Certain example systems and methods described herein are able to monitor or track events in process management systems. In one aspect, there is provided a device for monitoring events in process management systems, the device comprising: a processor; a communications module coupled to the processor; and a memory coupled to the processor, the memory storing computer executable instructions that when executed by the processor cause the device to: obtain first event data from a plurality of process management systems, each process management system being associated with a corresponding process flow; asynchronously from obtaining the first event data, provide second event data for at least two of the plurality of process management systems, to a monitoring tool, the second event data for the at least two process management systems being generated from a same client interacting with the at least two process management systems; and in response to providing the second event data to the monitoring tool, initiate at least one action to be executed.

In another aspect, there is provided a method of monitoring events in process management systems, the method executed by a device having a communications module and a memory, and comprising: obtaining first event data from a plurality of process management systems, each process management system being associated with a corresponding process flow; asynchronously from obtaining the first event data, providing second event data for at least two of the plurality of process management systems, to a monitoring tool, the second event data for the at least two process management systems being generated from a same client interacting with the at least two process management systems; and in response to providing the second event data to the monitoring tool, initiating at least one action to be executed.

In another aspect, there is provided a non-transitory computer readable medium for monitoring events in process management systems, the computer readable medium comprising computer executable instructions for: obtaining first event data from a plurality of process management systems, each process management system being associated with a corresponding process flow; asynchronously from obtaining the first event data, providing second event data for at least two of the plurality of process management systems, to a monitoring tool, the second event data for the at least two process management systems being generated from a same client interacting with the at least two process management systems; and in response to providing the second event data to the monitoring tool, initiating at least one action to be executed In certain example embodiments, the first event data can be received asynchronously from a plurality of process management systems. Second data for at least two of the plurality of process management systems can also be provided. The second event data from the at least two process management systems can be associated with a same client. The second event data from the at least two process management systems can also be associated with a same administrator or employee.

In certain example embodiments, the first event data stored in the event repository can be provided to an analytics system to enable a snapshot of the state of a plurality of process management systems to be analyzed.

In certain example embodiments, the first event data comprises a request identifier associated with at least one corresponding process flow. The request identifier can be associated with a single request to initiate multiple process flows across multiple process management systems. The request can also be associated with a client onboarding process. For example, the client onboarding process can be provided by a single user interface for the multiple process management systems.

In certain example embodiments, the first event data can be received from a financial institution system comprising a plurality of process management systems.

FIG. 1 illustrates an exemplary computing environment 8. In one aspect, the computing environment 8 may include an event monitoring system 10, one or more client devices 12, and a communications network 14 connecting one or more components of the computing environment 8.

The computing environment 8 may also include a financial institution system 16 (e.g., for a commercial bank) that provides financial services accounts to users and processes financial transactions associated with those financial service accounts. While several details of the financial institution system 16 have been omitted for clarity of illustration, reference will be made to FIG. 3 below for additional details. In this example the event monitoring system 10 is provided with or by the financial institution system 16, however, the event monitoring system 10 can also be implemented separately. The computing environment 8 may also include one or more process management systems 11 that can include or otherwise represent components, services and features associated with the one or more process management systems 11, e.g., one or more business process management systems 11 associated with the financial institution system 16.

The event monitoring system 10 and/or the financial institution system 16 includes or otherwise has access to a datastore for storing event data in an event repository 18. The financial institution system 16 also includes or otherwise has access to a datastore for storing client data 20 such as user profile data, financial/transaction data, etc. The process management system(s) 11 include(s) or otherwise has/have access to a datastore for storing workflow data 22. The workflow data 22 may include any information or content, such as documents, forms, metadata, electronic messages, alerts, statuses, events, notifications, profile data, etc. that have been associated with one or more process workflows. As such, the workflow data 22 can be mapped to the event repository 18 and/or the client data 20 or be included in one of these datastores. The client data 20 can include data associated with a user such as client profile data that may be mapped to corresponding financial data for that user and/or may include some of the financial data. It can be appreciated that such financial data could also include transaction data. Moreover, the datastores in FIG. 1 are shown separately for illustrative purposes and, when controlled by the same enterprise (e.g., financial institution system 16) can be combined into a single datastore, database, or other memory. The client data 20 can include both data that is associated with a client (e.g., profile data) as well as data that is associated with one or more user accounts for that client as recognized by the computing environment 8.

The data associated with a client may include, without limitation, demographic data (e.g., age, gender, income, location, etc.), preference data input by the client, and inferred data generated through machine learning, modeling, pattern matching, or other automated techniques. The client data 20 may also include historical interactions and transactions associated with the financial institution system 16 and/or process management systems 11, e.g., login history, search history, communication logs, documents, etc.

It can also be appreciated that while the process management system(s) 11 and financial institution system 16 are shown as separate entities in FIG. 1, they may also be part of the same system. For example, the process management system(s) 11 can be part of the financial institution system 16 and its various applications, services and processes that are implemented with and on behalf of clients/users/customers.

Client devices 12 may be associated with one or more users. Users may be referred to herein as customers, clients, correspondents, or other entities that interact with the financial institution system 16 and/or process management system(s) 11 (directly or indirectly). The client devices 12 shown in FIG. 1 also represent users associated with employees or other administrators or members of the financial institution system 16 or other enterprise in which the event monitoring system 10 is integrated. The computing environment 8 may include multiple client devices 12, each client device 12 being associated with a separate user or associated with one or more users. In certain embodiments, a user may operate client device 12 such that client device 12 performs one or more processes consistent with the disclosed embodiments. For example, a customer may use client device 12 to engage and interface with a mobile or web-based banking application which uses or incorporates one or more process management systems 11 to perform services or provide applications or functionality to that customer. In certain aspects, client device 12 can include, but is not limited to, a personal computer, a laptop computer, a tablet computer, a notebook computer, a hand-held computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device, and may be operable to transmit and receive data across communication network 14.

Communication network 14 may include a telephone network, cellular, and/or data communication network to connect different types of client devices 12. For example, the communication network 14 may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet).

In one embodiment, event monitoring system 10 and process management system(s) 11 may be implemented using one or more computer systems configured to process and store information and execute software instructions to perform one or more processes consistent with the disclosed embodiments. In certain embodiments, although not required, event monitoring system 10 and/or process management system(s) 11 may be associated with one or more business entities. In certain embodiments, event monitoring system 10 and/or process management system(s) 11 may represent or be part of any type of business entity. For example, event monitoring system 10 and/or process management system(s) 11 may be a system associated with a commercial bank (e.g., financial institution system 16), a retailer, or some other type of business. The event monitoring system 10 and/or process management system(s) 11 can also operate as standalone entities that are configured to serve multiple business entities, e.g., to act as an agent therefor.

Referring back to FIG. 1, the event monitoring system 10, financial institution system 16 and/or process management system(s) 11 may also include a cryptographic server (not shown) for performing cryptographic operations and providing cryptographic services (e.g., authentication (via digital signatures), data protection (via encryption), etc.) to provide a secure interaction channel and interaction session, etc. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public and private keys in a PKI), and perform other cryptographic operations that are required or desired for particular applications of the event monitoring system 10, financial institution system 16, and process management system(s) 11. The cryptographic server may be used to protect the data 18, 20, 22 stored in the respective datastores by way of encryption for data protection, digital signatures or message digests for data integrity, and by using digital certificates to authenticate the identity of the users and client devices 12 with which the event monitoring system 10, the financial institution system 16, and the process management system(s) 11 communicate to inhibit data breaches by adversaries. It can be appreciated that various cryptographic mechanisms and protocols can be chosen and implemented to suit the constraints and requirements of the particular deployment of the event monitoring system 10, the financial institution system 16, and the process management system(s) 11 as is known in the art.

Figure 2:
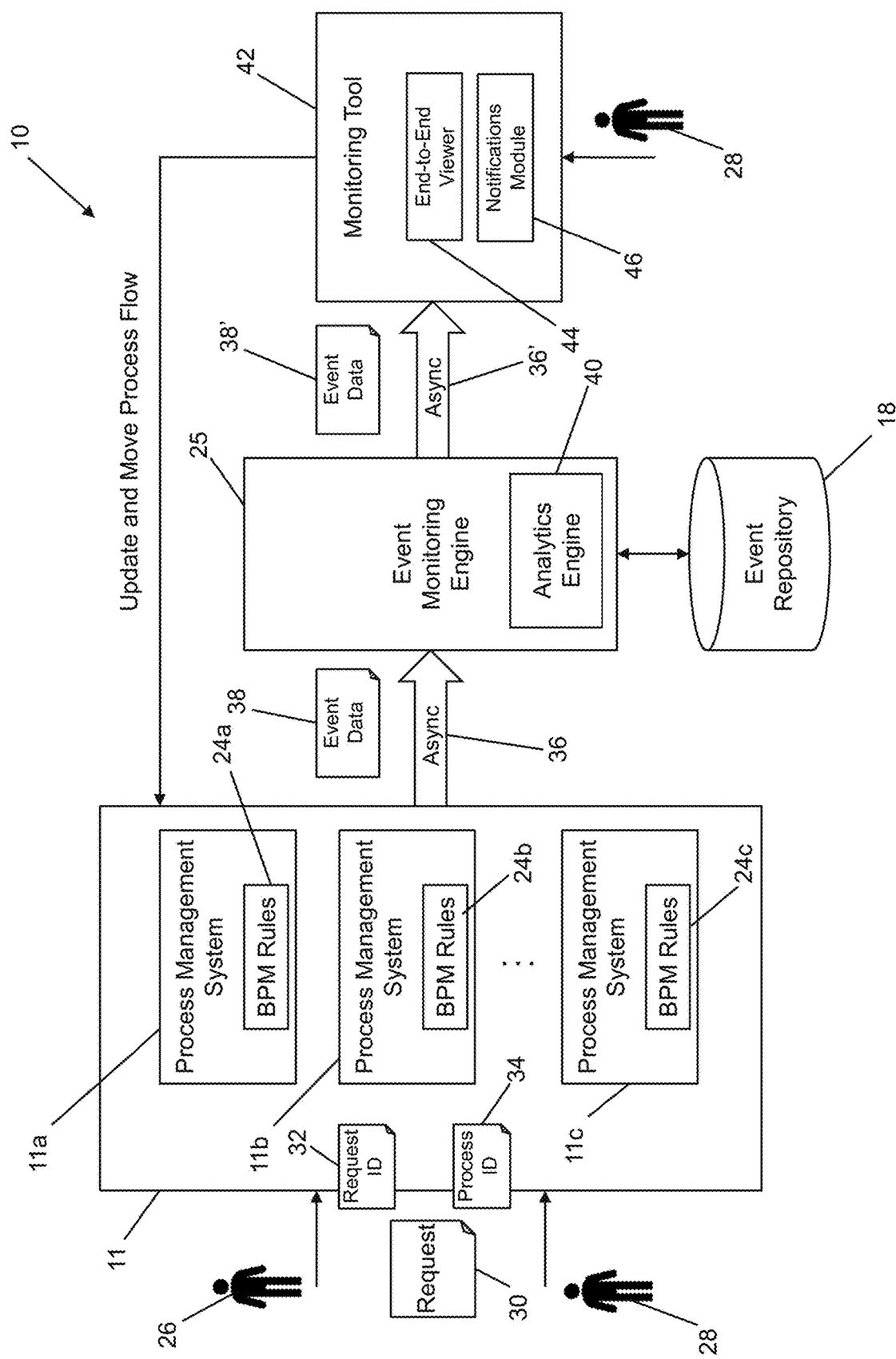
FIG. 2 is a schematic diagram of the example computing environment showing further detail of an event monitoring system coupled to a unified process management system environment.

In FIG. 2, an example configuration of the event monitoring system 10 is shown. The event monitoring system 10 includes an event monitoring engine 25 that is configured to decouple the one or more process management systems 11, which produce event data related to respective management workflows; from a monitoring tool 42 or other entity that consumes such event data. The one or more process management systems 11 in this example includes three separate process management systems 11a, 11b, 11c, each having its own business process management (BPM) rules 24a, 24b, 24c. It can be appreciated that any one or more process managements systems 11a can work with the event monitoring system 10 and three is only illustrative. The process management systems 11 can be stand-alone and self-sufficient environments in which process workflows are implemented or can be interconnected with other process management systems 11, e.g., to implement an integrate workflow across multiple business units or sub-units within an enterprise or other organization. The BPM rules 24 can include any criteria or parameters or framework elements within which the workflow(s) being implemented by the corresponding process management system 11 are to follow or conform.

FIG. 2 illustrates two types of users, namely a customer user 26 and an employee user 28. It can be appreciated that the customer user 26 can represent any client or consumer that interacts with at least one of the process management systems 11a, 11b, 11c, whether or not that customer user 26 is associated with the financial institution system 16 (provided by way of illustration only). The users 26 can interact with a process management system 11a, 11b, 11c to engage in or contribute to a process workflow (e.g., onboarding, registering, applying, transferring, etc.) by making a request 30. Each request 30 can be assigned a unique request ID 32 to identify the events, users, and other data or information associated with the request 30 as the process workflow progresses. A process ID 34 can also be generated for the process(es) and/or subprocess(es) associated with the process workflow. These identifiers 32, 34 can be associated with event data 38 that is generated and made available to the event monitoring engine 25 via an asynchronous channel 36. The event data 38 may be generated periodically or continuously in real-time as process workflows progress (or do not progress). The event data 38 can includes status updates, inactivity alerts, progress alerts, milestones, completion notices, commencement notices, or any other event-related notifications or information. The event monitoring engine 25 receives the event data 38 and persists the event data 38 in the event repository 18 to be consumed by the analytics engine 40 for analyzing the event data 38 and to be consumed asynchronously from receiving the event data 38 by the monitoring tool 42. In this example a second asynchronous channel 36' is established between the event monitoring engine 25 and the monitoring tool 42 to provide snapshots of event data 38' pulled from the event repository 18. Since the event data 38 produced by the process management systems 11 is decoupled from the consumers of that data, the event repository 18 can be continually updated while such snapshots providing a near real-time view of what is happing in the process workflows. In this way, employee users 28 can visualize the workflows in an end-to-end fashion across multiple consumer users 26 or across the various consumer users 26 handled by a particular employee user 28. The monitoring tool 42 in this example includes an end-to-end viewer 44, which can provide a graphical user interface to enable employee users 28 to view workflow progress and other data or metrics associated with the operations of the process management systems 11. The monitoring tool 42 also includes a notification module 46 that allows notifications, alerts, instructions, or other messages to be generated by an employee user 28 to communicate with the consumer users 26, other employee users 28, or the process management systems 11 themselves, e.g., to update and move a process flow as shown in the feedback loop provided in FIG. 2.

Figure 3:
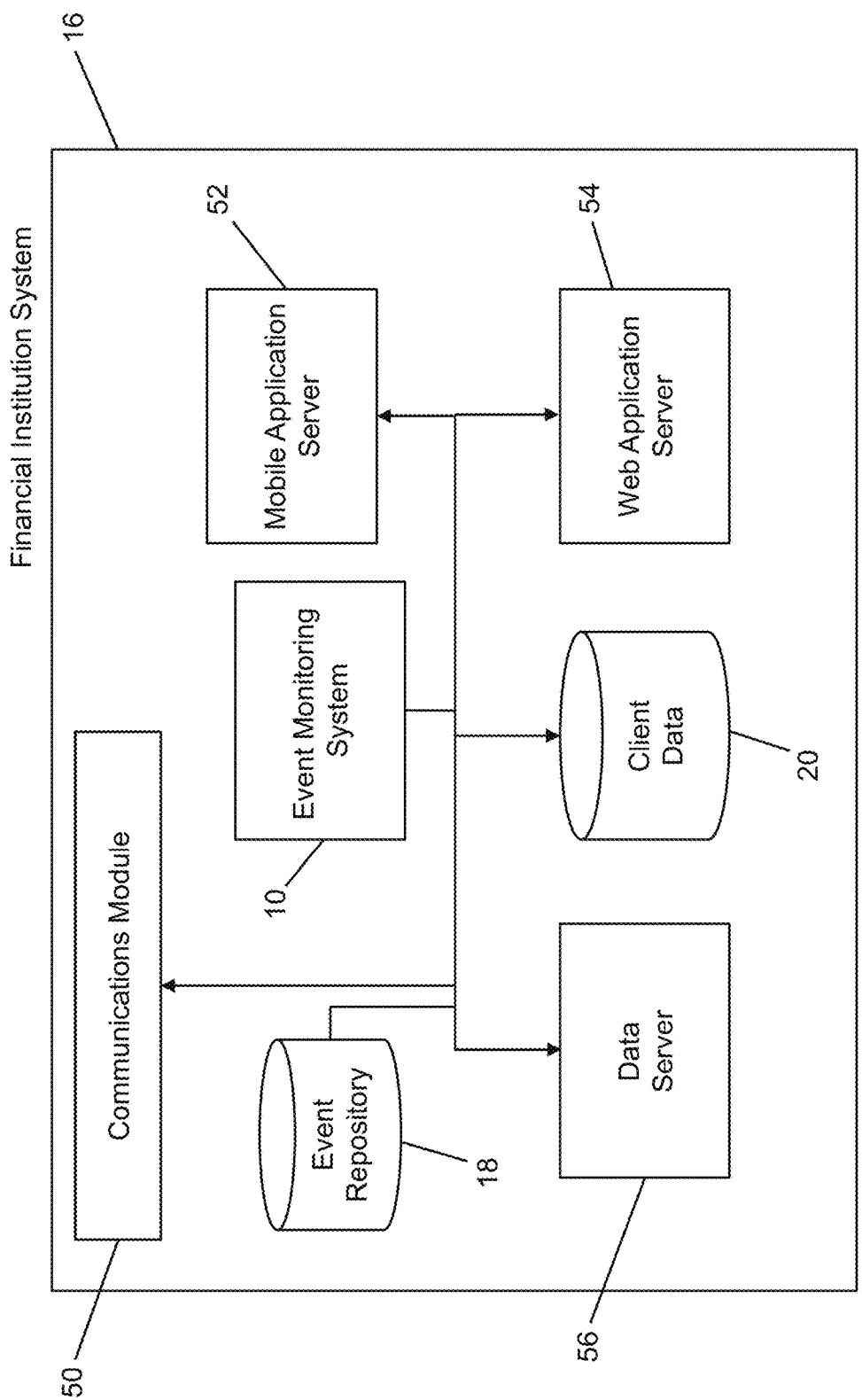
FIG. 3 is a block diagram of an example configuration of a financial institution system.

In FIG. 3, an example configuration of the financial institution system 16 is shown. The financial institution system 16 includes a communications module 50 that enables the financial institution system 16 to communicate with one or more other components of the computing environment 8, such as client device 12 (or one of its components) or the process management system(s) 11, via a bus or other communication network, such as the communication network 14. While not delineated in FIG. 3, the system 16 includes at least one memory or memory device that can include a tangible and non-transitory computer-readable medium having stored therein computer programs, sets of instructions, code, or data to be executed by one or more processors (not shown for clarity of illustration), FIG. 3 illustrates examples of servers and datastores/databases operable within the financial institution system 16. It can be appreciated that any of the components shown in FIG. 3 may also be hosted externally and be available to the system 16, e.g., via the communications module 50. In the example embodiment shown in FIG. 3, the financial institution system 16 includes one or more servers to provide access to the client data 20 (which may include in financial data) to the event monitoring system 10 and process management system(s) 11 to enable workflows to progress. Exemplary servers include a mobile application server 52, a web application server 54 and a data server 56. Although not shown in FIG. 3, as noted above, the financial institution system 16 may also include a cryptographic server for performing cryptographic operations and providing cryptographic services. The cryptographic server can also be configured to communicate and operate with a cryptographic infrastructure. The system 16 may also include one or more datastores for storing and providing data for use in such services, such as data storage for storing the client data 20 and event data 38 stored in the event repository 18.

Mobile application server 52 supports interactions with a mobile application installed on client device 12. Mobile application server 52 can access other resources of the financial institution system 16 to carry out requests made by, and to provide content and data to, a mobile application on client device 12. In certain example embodiments, mobile application server 52 supports one or more mobile banking and/or investment applications to provide payments from one or more accounts of user, among other things.

Web application server 54 supports interactions using a website accessed by a web browser application 92 (see FIG. 5) running on the client device 12. It can be appreciated that the mobile application server 52 and the web application server 54 can provide different front ends for the same application, that is, the mobile (app) and web (browser) versions of the same application. For example, the financial institution system 16 may provide a banking application that be accessed via a smartphone or tablet app while also being accessible via a browser on any browser-enabled device.

The client data 20 may be associated with users of the client devices 12 (e.g., customers of the financial institution). The client data 20 may include financial data such as any data related to or derived from financial values or metrics associated with customers of the financial institution system 16, for example, account balances, transaction histories, line of credit available, credit scores, mortgage balances, affordability metrics, investment account balances, investment values and types, among many others. Other metrics can be associated with such financial data, such as financial health data that is indicative of the financial health of the users of the client devices 12. As indicated above, it can be appreciated that the client data 20 can also include user profile data and transaction data.

The event monitoring system 10 is an example of a module, function, service, tool or option provided within the financial institution system 16 that may be used by one or more of the servers 52, 54, 56 to enable users and/or administrators to interact or integrate with the process management system(s) 11. For example, the event monitoring system 10 can be used by the financial institution system 16 to leverage event data 38 obtained by the event monitoring engine 25 and certain client data 20 to enhance the monitoring and implementation of workflows such as in an onboarding process.

Figure 4:
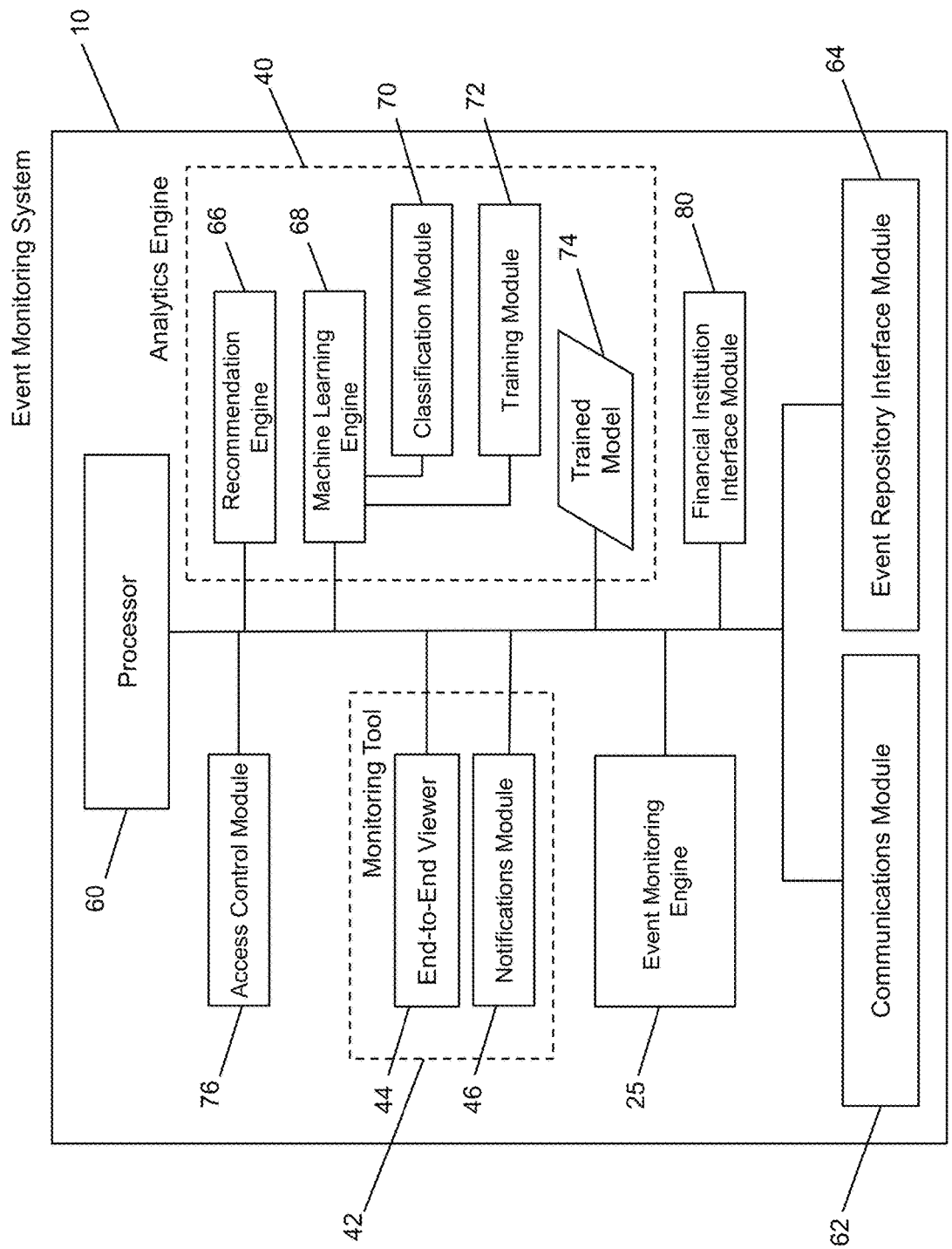
FIG. 4 is a block diagram of an example configuration of the event monitoring system.

In FIG. 4, an example configuration of the event monitoring system 10 is shown. In certain embodiments, the event monitoring system 10 may include one or more processors 60, a communications module 62, and an event repository interface module 64 for interfacing with the event repository 18 to retrieve, modify, and store (e.g., add) data. Communications module 62 enables the event monitoring system 10 to communicate with one or more other components of the computing environment 8, such as client device 12 (or one of its components), via a bus or other communication network, such as the communication network 14. While not delineated in FIG. 4, the event monitoring system 10 includes at least one memory or memory device that can include a tangible and non-transitory computer-readable medium having stored therein computer programs, sets of instructions, code, or data to be executed by processor 60. FIG. 4 illustrates examples of modules, tools and engines stored in memory on the event monitoring system 10 and operated by the processor 60. It can be appreciated that any of the modules, tools, and engines shown in FIG. 4 may also be hosted externally and be available to the event monitoring system 10, e.g., via the communications module 62. In the example embodiment shown in FIG. 4, the event monitoring system 10 includes the analytics engine 40, which includes a recommendation engine 66, a machine learning engine 68, a classification module 70, a training module 72, and a trained model 74. The event monitoring system 10 also includes an access control module 76, an event monitoring module 78, and a financial institution interface module 80. The event monitoring system 10 also includes the monitoring tool 42 that includes or otherwise provides functionality associated with the end-to-end viewer 44 and notifications module 46.

The recommendation engine 66 is used by the analytics engine 40 of the event monitoring system 10 to generate one or more recommendations for the event monitoring system 10 and/or a client device 12 that is/are related to an association between event data 38 monitored by the system 10 and the users or process workflows in which the users are engaged. For example, the analytics engine 40 can obtain a snapshot of event data 38' related to a particular user from the event repository 18 to determine how to improve the workflow(s) or to extract insights into how that user interacts with the financial institution system 16 and/or process management systems 11a, 11b, 11c. It may be noted that a recommendation as used herein may refer to a prediction, suggestion, inference, association or other recommended identifier that can be used to generate a suggestion, notification, command, instruction or other data that can be viewed, used or consumed by the event monitoring system 10, the financial institution system 16 and/or the client devices 12. The recommendation engine 66 can access the data in the event repository 18 and, if permitted, the client data 20 and/or workflow data 22 via the event repository interface module 64 and/or communication module 62 and apply one or more inference processes to generate the recommendation(s). The recommendation engine 66 may utilize or otherwise interface with the machine learning engine 68 to both classify data currently being analyzed to generate a suggestion or recommendation, and to train classifiers using data that is continually being processed and accumulated by the event monitoring system 10. That is, the recommendation engine 66 can learn event- or workflow-related preferences and revise and refine classifications, rules or other analytics-related parameters over time. For example, the analytics engine 40 can be used to update and refine the BPM rules 24 associated with a process management system 11 based on the learning or other analytics performed, e.g., based on recommendations to change or add rules.

The machine learning engine 68 may also perform operations that classify the event data in accordance with corresponding classifications parameters, e.g., based on an application of one or more machine learning algorithms to each of the groups of data 18, 20, 22 (also referred to herein as "user content", "event or workflow content", "user information" or "client information"). The machine learning algorithms may include, but are not limited to, a one-dimensional, convolutional neural network model (e.g., implemented using a corresponding neural network library, such as Keras®), and the one or more machine learning algorithms may be trained against, and adaptively improved, using elements of previously classified profile content identifying suitable matches between content identified and potential actions to be executed. Subsequent to classifying the event- or workflow-related content or content being analyzed, the recommendation engine 66 may further process each element of the content to identify, and extract, a value characterizing the corresponding one of the classification parameters, e.g., based on an application of one or more additional machine learning algorithms to each of the elements of the event- or workflow-related content. By way of example, the additional machine learning algorithms may include, but are not limited to, an adaptive natural language processing algorithm that, among other things, predicts starting and ending indices of a candidate parameter value within each element of the content, extracts the candidate parameter value in accordance with the predicted indices, and computes a confidence score for the candidate parameter value that reflects a probability that the candidate parameter value accurately represents the corresponding classification parameter. As described herein, the one or more additional machine learning algorithms may be trained against, and adaptively improved using, the locally maintained elements of previously classified content. Classification parameters may be stored and maintained using the classification module 70, and training data may be stored and maintained using the training module 72.

The trained model 74 may also be created, stored, refined, updated, re-trained, and referenced by the event monitoring system 10 and/or financial institution system 16 (e.g., by way of the analytics engine 40) to determine associations between users, events, workflow or content related thereto. Such associations can be used to generate recommendations or suggestions for improving or streamlining workflows or to identify efficiencies that could be injected into such workflows based on other available user information.

In some instances, classification data stored in the classification module 70 may identify one or more parameters, e.g., "classification" parameters, that facilitate a classification of corresponding elements or groups of recognized content based on any of the exemplary machine learning algorithms or processes described herein. The one or more classification parameters may correspond to parameters that can indicate an affinity or compatibility between the data 18, 20, 22, and certain potential actions. For example, a bottleneck at a certain point in a workflow seen across multiple user experiences can be used to generate a recommendation or action related to alleviating that bottleneck, e.g., by redirecting resources within an enterprise.

In some instances, the additional, or alternate, machine learning algorithms may include one or more adaptive, natural-language processing algorithms capable of parsing each of the classified portions of the content and predicting a starting and ending index of the candidate parameter value within each of the classified portions. Examples of the adaptive, natural-language processing algorithms include, but are not limited to, natural-language processing models that leverage machine learning processes or artificial neural network processes, such as a named entity recognition model implemented using a SpaCy® library.

Examples of these adaptive, machine learning processes include, but are not limited to, one or more artificial, neural network models, such as a one-dimensional, convolutional neural network model, e.g., implemented using a corresponding neural network library, such as Keras®. In some instances, the one-dimensional, convolutional neural network model may implement one or more classifier functions or processes, such a Softmax® classifier, capable of predicting an association between an element of event data (e.g., a value or type of data being augmented with an event or workflow) and a single classification parameter and additionally, or alternatively, multiple classification parameters.

Based on the output of the one or more machine learning algorithms or processes, such as the one-dimensional, convolutional neural network model described herein, machine learning engine 68 may perform operations that classify each of the discrete elements of event—or workflow-related content as a corresponding one of the classification parameters, e.g., as obtained from classification data stored by the classification module 70.

The outputs of the machine learning algorithms or processes may then be used by the recommendation engine 66 to generate one or more suggested recommendations, notifications, rules, instructions or other instructional or observational elements that can be presented to the user (e.g., client or employee).

Referring again to FIG. 4, the access control module 76 may be used to apply a hierarchy of permission levels or otherwise apply predetermined criteria to determine what event repository data 18, client or workflow data in the datastores 20, 22 or other financial or transactional data can be shared with which entity in the computing environment 8. For example, the event monitoring system 10 may have been granted access to certain sensitive transaction data or financial data for a user, which is associated with a certain client device 12 in the computing environment 8. Similarly, certain client data 20 may include potentially sensitive information such as age, date of birth, or nationality, which may not necessarily be needed by the event monitoring system 10 to execute certain actions. As such, the access control module 76 can be used to control the sharing of certain client data 20, workflow data 22, or event data stored in the event repository 18 based on a type of client/user/customer/employee, a permission or preference, or any other restriction imposed by the computing environment 8 or application in which the event monitoring system 10 is used.

The event monitoring system 10 in this example also includes the monitoring tool 42 described above, which provides the end-to-end viewer 44 and notifications module 46 to enable an employee to interface and interact with the event monitoring system 10 to asynchronously consume the event data in the event repository 18 and to use the analytics system 40 for additional functionality and insights.

The event monitoring engine 25 is also shown in FIG. 4 which, as described above, asynchronously saves, stores, and retrieves event data 38, 38' to/from the event repository 18 as herein described. As illustrated in FIG. 4, the event monitoring engine 25 can be considered a device having a processor 60, memory and a communications module 62 configured to work with or as part of the event monitoring engine 25 to perform the operations described herein. It can be appreciated that the various elements of the event monitoring system 10 are shown delineated as such in FIG. 4 for illustrative purposes and clarity of description and could be provided using other configurations and distribution of functionality and responsibilities.

The event monitoring system 10 may also include a financial institution interface module 80 to provide a graphical user interface (GUI) or API connectivity to communicate with the financial institution system 16 to obtain client data 20 and workflow data 22 for a certain user/users or workflow. It can be appreciated that the financial institution interface module 80 may also provide a web browser-based interface, an application or "app" interface, a machine language interface, etc.

Figure 5:
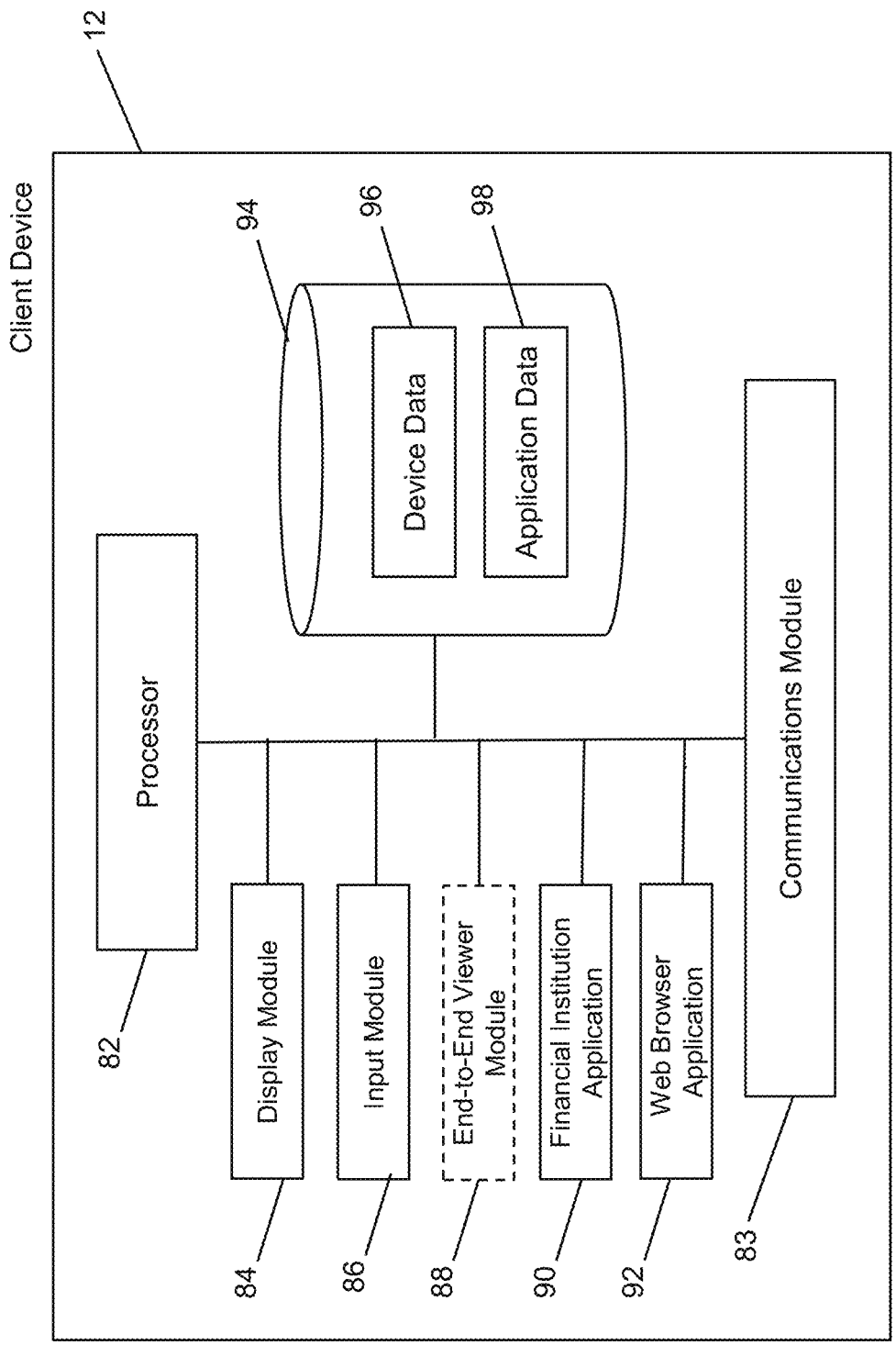
FIG. 5 is a block diagram of an example configuration of a client computing device associated with a user, customer, or client.

In FIG. 5, an example configuration of the client device 12 is shown. In certain embodiments, the client device 12 may include one or more processors 82, a communications module 83, and a data store 94 storing device data 96 and application data 98. Communications module 83 enables the client device 12 to communicate with one or more other components of the computing environment 8, such as event monitoring system 10, process management system(s) 11, financial institution system 16, via a bus or other communication network, such as the communication network 14. While not delineated in FIG. 5, the client device 12 includes at least one memory or memory device that can include a tangible and non-transitory computer-readable medium having stored therein computer programs, sets of instructions, code, or data to be executed by processor 82. FIG. 5 illustrates examples of modules and applications stored in memory on the client device 12 and operated by the processor 82. It can be appreciated that any of the modules and applications shown in FIG. 5 may also be hosted externally and be available to the client device 12, e.g., via the communications module 83.

In the example embodiment shown in FIG. 5, the client device 12 includes a display module 84 for rendering GUIs and other visual outputs on a display device such as a display screen, and an input module 86 for processing user or other inputs received at the client device 12, e.g., via a touch-screen, input button, transceiver, microphone, keyboard, etc. The client device 12 may also include an end-to-end viewer module 88, which may take the form of a customized app, plug-in, widget, or software component provided by the event monitoring system 10 for use by the client device 12 to monitor events. It can be appreciated that the end-to-end view module 88 is shown in dashed lines in FIG. 5 as it may be available only to client devices 12 used by employees and not customers. Similarly, the client device 12 may include a financial institution application 90 provided by theft financial institution system 16, e.g., for performing mobile banking operations. The client device 12 in this example embodiment also includes a web browser application 92 for accessing Internet-based content, e.g., via a mobile or traditional website. The data store 94 may be used to store device data 96, such as, but not limited to, an IP address or a MAC address that uniquely identifies client device 12 within environment 8. The data store 94 may also be used to store application data 98, such as, but not limited to, login credentials, user preferences, cryptographic data (e.g., cryptographic keys), etc.

It will be appreciated that only certain modules, applications, tools and engines are shown in FIGS. 2 to 5 for ease of illustration and various other components would be provided and utilized by the event monitoring system 10, process management system(s) 11, financial institution system 16, and client device(s) 12, as is known in the art.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of any of the servers or other devices in event monitoring system 10, or process management system(s) 11, or financial institution system 16, or client device(s) 12, or accessible or connectable thereto. Any application or module herein described may be implemented using computer readable/executable instructions that may be stored or otherwise held by such computer readable media.

Referring now to FIG. 6, an example embodiment of computer executable instructions for monitoring events in process management systems 11 is shown. At block 100, first event data 38 (i.e., event data being produced by one or more process management systems 11) is received by the event monitoring engine 25 from such one or more process management systems 11. It can be appreciated that the first event data 38 can include separate event data 38 from individual process management systems 11 (e.g., 11a, 11b, 11c in FIG. 2), or consolidated event data 38 combined from multiple ones of such process management systems 11. The event monitoring engine 25 stores the first event data 38 in the event repository 18 at block 102 to enable the first event data 38 to be available to consumers of such data without disrupting the provision of such data 38 by the one or more process management systems 11. At block 104, the event monitoring engine 25 can thus asynchronously provide second event data 38' to such data consumers, such as the monitoring tool 42, analytics engine 40, or other entities, processes or applications (e.g., financial institution application 92).

In FIG. 7, an example embodiment of computer executable instructions for utilizing or consuming the second event data 38' described above is shown, e.g., by the monitoring tool 42. At block 110, the monitoring tool 42 can provide end-to-end views of one or more workflows, e.g., using the end-to-end viewer 44, examples of which are described below. At block 112, the monitoring tool 42 can also initiate a feedback loop with one or more of the process management systems 11, e.g., to update or advance a process workflow. For example, an employee can visualize a workflow, determine a missing element or another step can be taken to advance a workflow, and send an instruction, alert, notification or other message to assist or automatically progress the workflow. It can be appreciated that the workflow data 22 can also be updated at this time. At block 114, notifications can be sent, e.g., to a consumer user 26 or another employee user 28 by providing access to the notifications module 46. These notifications can be sent to the client devices 12 associated with the user 26, 28, e.g., via SMS, email, instant messaging, phone, etc.

Figure 8:
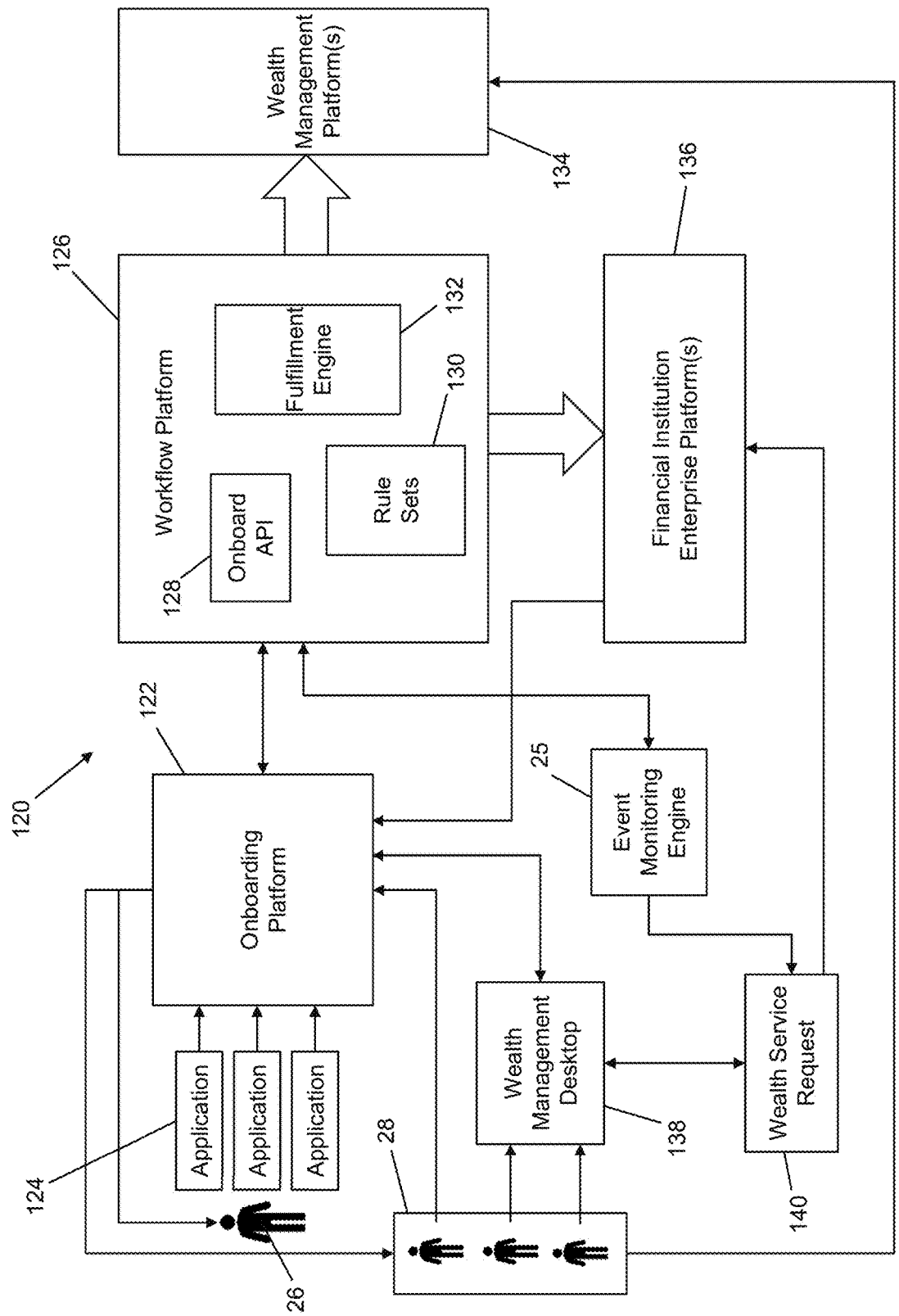
FIG. 8 is a block diagram of an example configuration for a wealth management onboarding system implementation of the event monitoring system.

In FIG. 8, an example configuration of an onboarding environment 120, which incorporates the event monitoring system 10 is shown. In this example, the onboarding environment 120 is implemented in or with a wealth management enterprise, environment or system. In certain embodiments, the onboarding environment 120 may include an onboarding platform 122 that is interposed between a number of applications 124 associated with an onboarding process (e.g., multiple wealth management-based applications 124 such as securities trading, banking, lending, etc.). The onboarding platform 122 can be used to provide a central interface for such applications to control the flow of onboarding requests to a workflow platform 126 for implementing the associated workflows (e.g., for implementing a number of process management systems 11—not shown in FIG. 8). The workflow platform 126 includes an onboard application programming interface (API) 128 to enable processes to integrate and communicate with the workflow platform 126 for onboarding and material change processes. The workflow platform 126 can also include rule sets 130 for the workflows that can be implementing using the platform 126, and a fulfillment engine for implementing tasks associated with a workflow.

As shown in FIG. 8, the onboarding platform 122 can also interface with a wealth management desktop program 138 that is accessed in this example by employee users 28, while the applications 124 are accessed and interacted with by the consumer users 26. The employee users 28 can also interact directly with the onboarding platform 122. The wealth management desktop program 138 can also interface with a wealth service request module 140 that is configured to interface with financial institution enterprise platforms 136 in the backend for providing such wealth management services. The event monitoring engine 25 can be installed with in the environment 120 in order to provide event monitoring functionality between the workflow platform and, in this example, the wealth service request 140. In this way, the employee users 28 can access the event monitoring functionality via the wealth management desktop 138 in the configuration shown in FIG. 8. The workflow platform 126 also interfaces with one or more wealth management platforms 134 that are also accessed directly by the employee users 28, e.g., in normal use of the wealth management applications and services.

Referring now to FIG. 9, an example embodiment of computer executable instructions for implementing an onboarding process within the environment of FIG. 8 is shown. At block 200, the onboarding environment 120 allows clients (e.g., consumer users 26 and/or employee users 28) to use an onboarding application via the onboarding platform 122 to start and submit onboarding requests. At block 202, the onboarding platform 122 can pull and pre-fill data for the client by communicating with the backend financial institution enterprise platform(s) 136. At block 204, the workflow platform initiates one or more associated workflows by accessing rule sets to support the onboarding process and, at block 206, requests are directed from the onboarding platform 122 to the workflow platform 126 via the onboard API 128. At block 208, the fulfillment engine 132 breaks down the requests into elemental individual components which are submitted for fulfillment processing. At block 210, the corresponding creation or updating of a workflow is initiated, with the support of dependencies and relationships relevant to the workflow. The backend systems are updated at block 212 and a fulfillment status update (e.g., event data 38) is generated at block 214 to provide status tracking for the event monitoring system via the event monitoring engine 25. The associated work items and backend systems are then updated at block 216. Since the event monitoring system 10 is integrated with the onboarding environment 120 as shown in FIG. 8, financial institution system 16 is able to asynchronously obtain end-to-end views of the onboarding process and provide feedback, instructions, notifications and other inputs to the process managements systems 11 associated with such onboarding.

Figure 10:
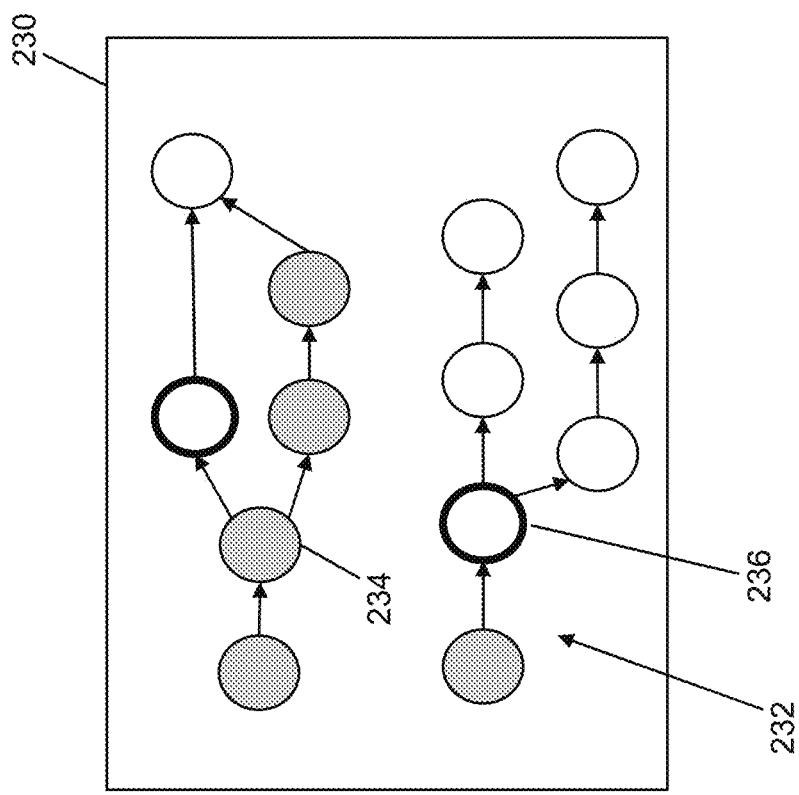
FIG. 10 is an example of a graphical user interface for an end-to-end view of multiple process workflows for a client.

Turning now to FIG. 10, a screen shot 230 of a workflow end-to-end viewer graphical user interface (GUI) is shown. In this example, a pair of workflows 232 are displayed visually for a consumer or employee user 26, 28 to visualize and monitor or track the progress in these workflows. Here, completed tasks 234 are shown in grey with current tasks 236 in bold. From this view, the user 26, 28 can determine which stages or steps are currently in progress and can allow a notification to be generated, e.g., to have the consumer provide certain information, sign a document, etc.

Figure 11:
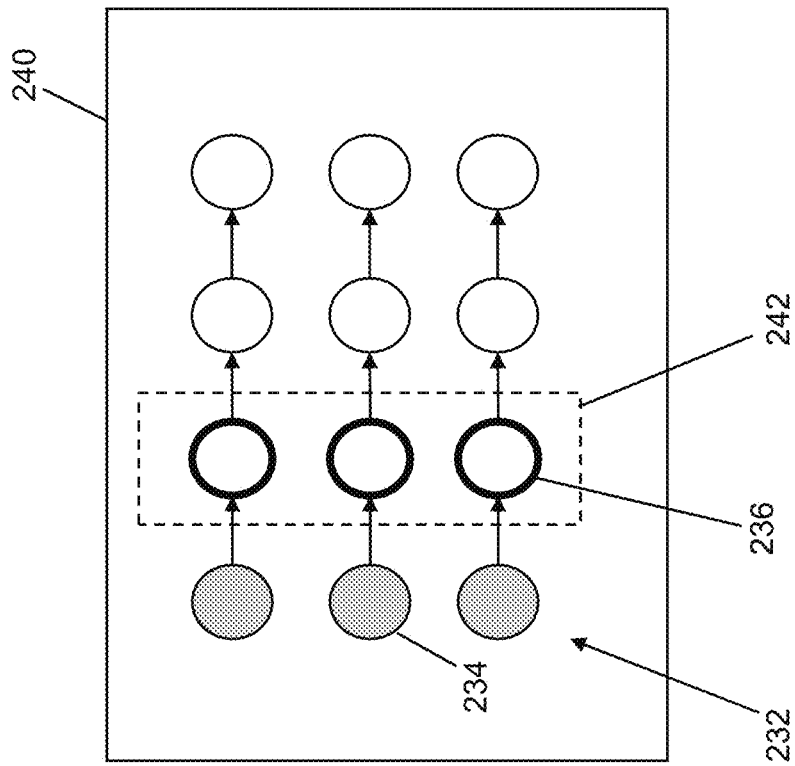
FIG. 11 is an example of a graphical user interface for an end-to-end view of multiple process workflows for an employee.

FIG. 11 illustrates a screen shot 240 of an end-to-end viewer GUI for a number of workflows 232 associated with the same employee user 28. This type of visualization allows an employee user 28 (or a supervisor of such employee) to determine where a bottleneck 242 has occurred. An actionable item can be determined or generated from observing the bottleneck, e.g., to provide a resource to the employee to alleviate the bottleneck 242.

Figure 13:
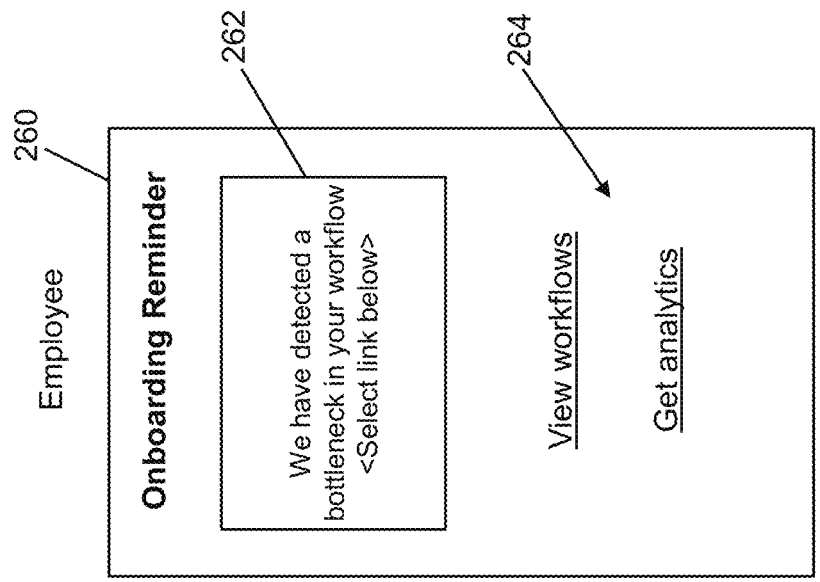
FIG. 13 is an example of a graphical user interface for an employee notification.
Figure 12:
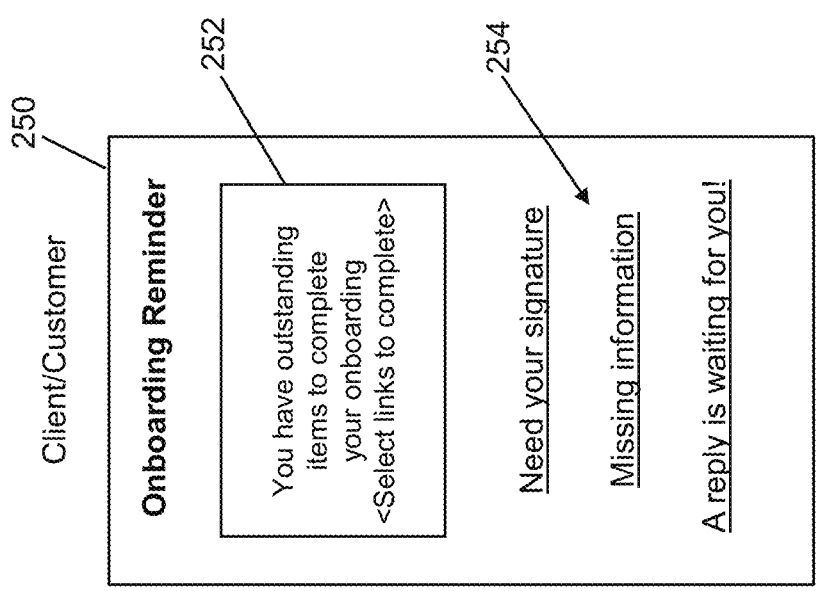
FIG. 12 is an example of a graphical user interface for a client notification.

FIGS. 12 and 13 are screen shots 250, 260 of example notification GUIs. In FIG. 12, an onboarding reminder message 252 is presented to a consumer user 26 with a number of links 254 to conveniently enable the user 26 to follow up to complete certain outstanding tasks. In this way, the notification 252 can be used to have workflows more efficiently advanced. In FIG. 13, an employee-related message 262 advises of a bottleneck and provides links 264 to allow for workflows to be visualized (e.g., by linking back to the end-to-end viewer 44) or to obtain more analytics from the analytics engine 40. In this way, the event monitoring system 10 can be leverages to improve the operability of a process management system 11.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A device for monitoring events in process management systems, the device comprising:
   a processor;
   a communications module coupled to the processor; and
   a memory coupled to the processor, the memory storing computer executable instructions that when executed by the processor cause the device to:
      obtain first event data from a plurality of process management systems, each process management system being associated with a corresponding process flow;
      asynchronously from obtaining the first event data, provide second event data for at least two of the plurality of process management systems to a monitoring tool, the second event data for the at least two process management systems being generated from a same client interacting with the at least two process management systems, the second event data including at least one event from each of the at least two process management systems, the at least one event determined using based on the first event data used to generate the second event data; and
      consume, with the monitoring tool, the second event data to initiate at least one action to be executed based on the at least one event from each of the at least two process management systems in the second event data.

2. The device of claim 1, wherein the at least one action to be executed, the at least one action being initiated by the monitoring tool, comprises at least one of: enabling viewing of events from the second event data that are associated with all of the plurality of process management systems, sending feedback to the plurality of process management systems for updating or advancing one or more of the plurality of process workflows, and enabling notifications to be sent to clients engaged with the plurality of process management systems.

3. The device of claim 1, wherein the first event data comprises a unique identifier associated with the corresponding process flow.

4. The device of claim 1, wherein the first event data is provided asynchronously to an event repository to enable the first event data to be obtained without disrupting the plurality of process management systems.

5. The device of claim 1, wherein the second event data from the at least two process management systems is associated with an administrator or employee client, or with a consumer client.

6. The device of claim 1, wherein the computer executable instructions further cause the processor to:
   provide the first event data to an analytics system to enable a snapshot of the state of a plurality of process management systems to be analyzed.

7. The device of claim 1, wherein the first event data comprises a request identifier associated with at least one corresponding process flow.

8. The device of claim 7, wherein the request identifier is associated with a single request to initiate multiple process flows across multiple process management systems.

9. The device of claim 8, wherein the request is associated with a client onboarding process.

10. The device of claim 9, wherein the client onboarding process is provided by a single user interface for the multiple process management systems.

11. The device of claim 1, wherein the first event data is received from a financial institution system comprising the plurality of process management systems.

12. A method of monitoring events in process management systems, the method executed by a device having a communications module and a memory, and comprising:
   obtaining first event data from a plurality of process management systems, each process management system being associated with a corresponding process flow;
   asynchronously from obtaining the first event data, providing second event data for at least two of the plurality of process management systems to a monitoring tool, the second event data for the at least two process management systems being generated from a same client interacting with the at least two process management systems, the second event data including at least one event from each of the at least two process management, the at least one event determined based on the first event data used to generate the second event data; and
   consuming, with the monitoring tool, the second event data to initiate at least one action to be executed based on the at least one event from each of the at least two process management systems in the second event data.

13. The method of claim 12, wherein the at least one action to be executed, the at least one action being initiated by the monitoring tool, comprises at least one of: enabling viewing of events from the second event data that are associated with all of the plurality of process management systems, sending feedback to the plurality of process management systems for updating or advancing one or more of the plurality of process workflows, and enabling notifications to be sent to clients engaged with the plurality of process management systems.

14. The method of claim 12, wherein the first event data comprises a unique identifier associated with the corresponding process flow.

15. The method of claim 12, wherein the first event data is provided asynchronously to an event repository to enable the first event data to be obtained without disrupting the plurality of process management systems.

16. The method of claim 12, further comprising:
   providing the first event data to an analytics system to enable a snapshot of the state of a plurality of process management systems to be analyzed.

17. The method of claim 12, wherein the first event data comprises a request identifier associated with at least one corresponding process flow.

18. The method of claim 17, wherein the request identifier is associated with a single request to initiate multiple process flows across multiple process management systems.

19. The method of claim 18, wherein the request is associated with a client onboarding process.

20. A non-transitory computer readable medium for monitoring events in process management systems, the computer readable medium comprising computer executable instructions for:
- obtaining first event data from a plurality of process management systems, each process management system being associated with a corresponding process flow;
- asynchronously from obtaining the first event data, providing second event data for at least two of the plurality of process management systems to a monitoring tool, the second event data for the at least two process management systems being generated from a same client interacting with the at least two process management systems, the second event data including at least one event from each of the at least two process management systems, the at least one event determined based on the first event data used to generate the second event data; and
- consuming, with the monitoring tool, the second event data to initiate at least one action to be executed based on the at least one event from each of the at least two process management systems in the second event data.

* * * * *